Jan. 1, 1952

A. EVANS ET AL 2,581,089

TURN BUTTON FOR AIRCRAFT COWLINGS

Filed May 10, 1946

INVENTORS
ARTHUR EVANS,
WILLIAM EDMUND EDWARDS,

BY Robert B Larson

ATTORNEY

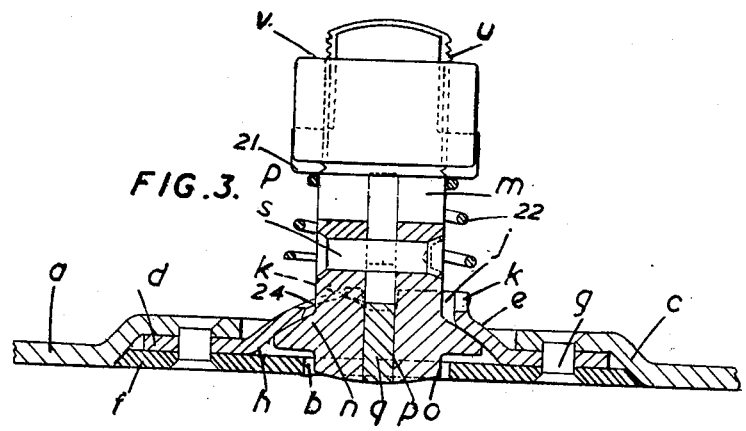
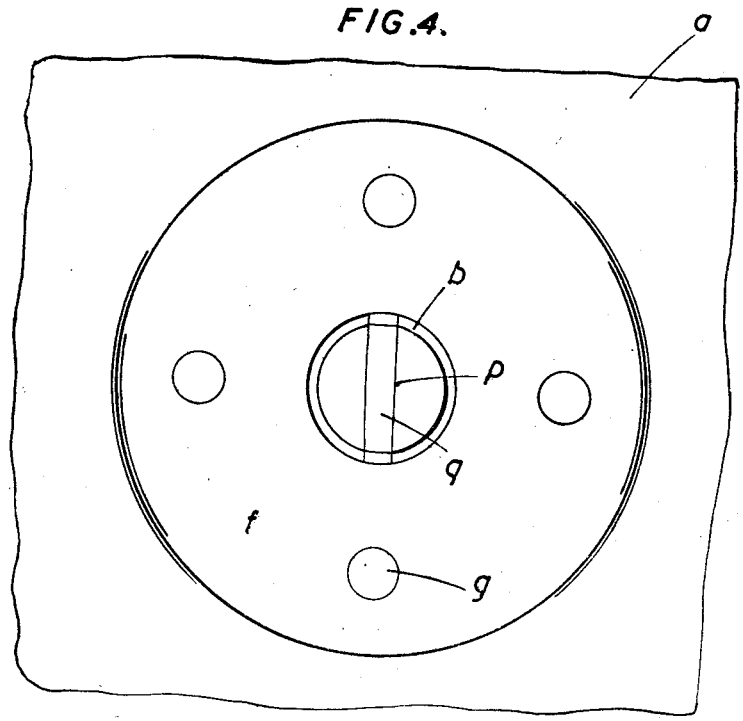

Jan. 1, 1952     A. EVANS ET AL     2,581,089
TURN BUTTON FOR AIRCRAFT COWLINGS
Filed May 10, 1946     4 Sheets-Sheet 3
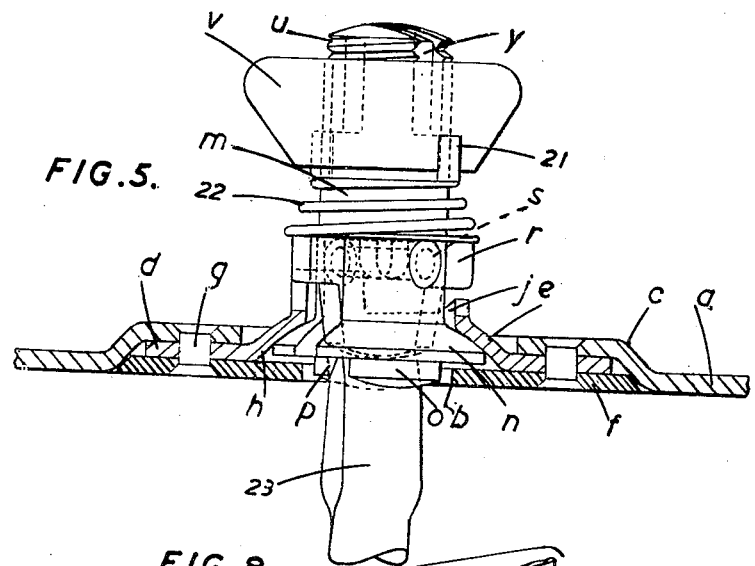
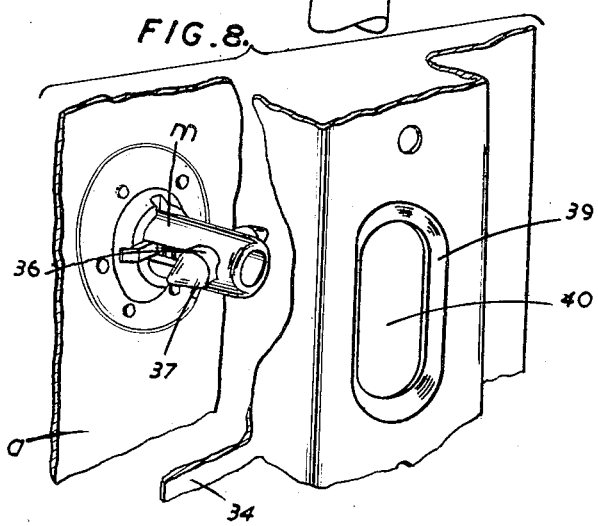
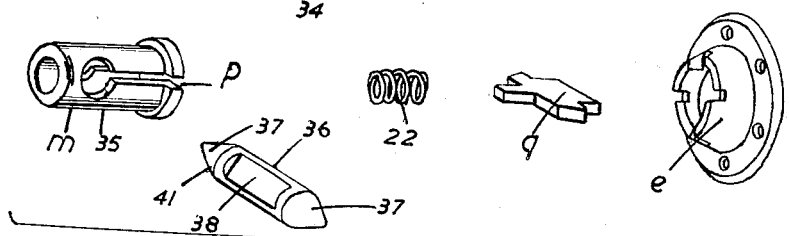
INVENTORS
ARTHUR EVANS,
WILLIAM EDMUND EDWARDS,
BY Robert B. Larson
ATTORNEY Jan. 1, 1952
A. EVANS ET AL
2,581,089
TURN BUTTON FOR AIRCRAFT COWLINGS
Filed May 10, 1946
4 Sheets-Sheet 4
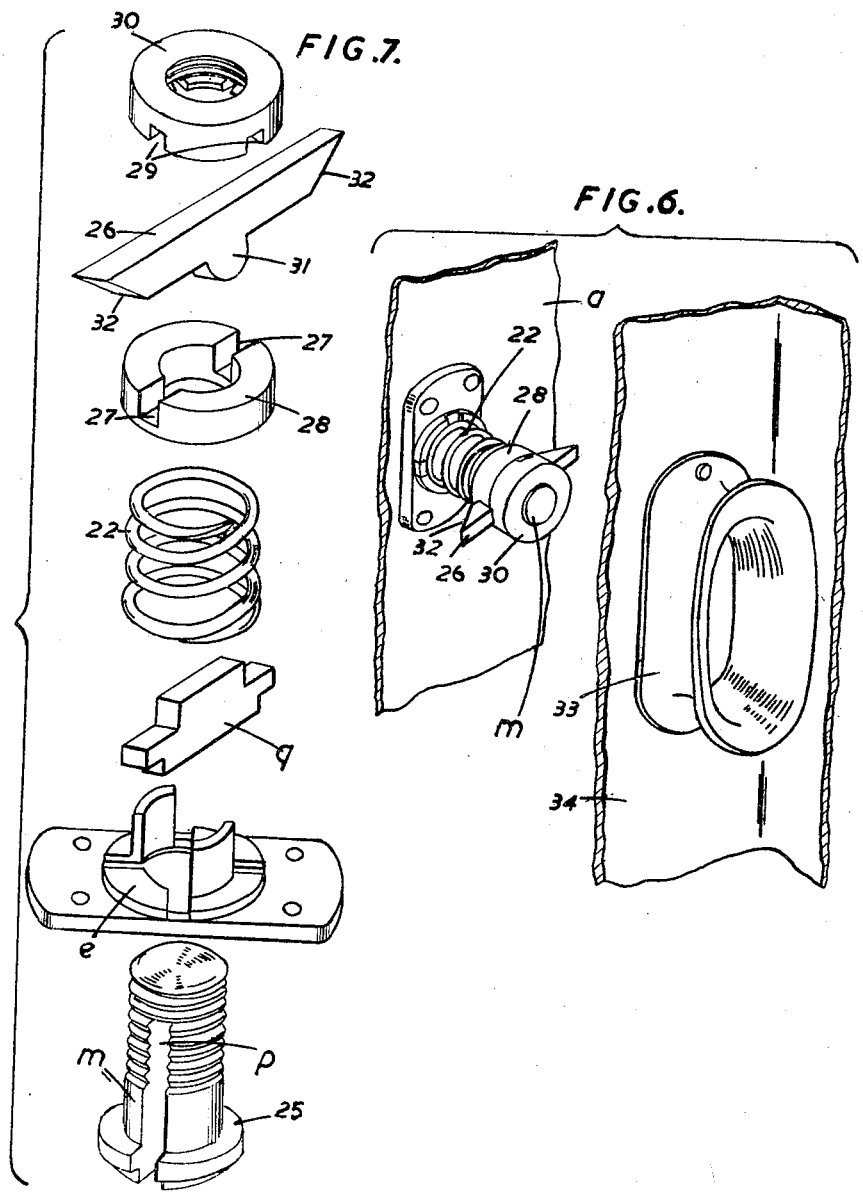
INVENTORS
ARTHUR EVANS,
WILLIAM EDMUND EDWARDS,
BY Robert B. Pearson
ATTORNEY Patented Jan. 1, 1952

2,581,089

UNITED STATES PATENT OFFICE 2,581,089

TURN BUTTON FOR AIRCRAFT COWLINGS

Arthur Evans, Southall, and William Edmund Edwards, London, England, assignors to The Fairey Aviation Company Limited, Hayes, England Application May 10, 1946, Serial No. 668,646
In Great Britain October 12, 1945

6 Claims. (Cl. 24—221)

This invention relates to turn buttons for aircraft cowlings and like fastening devices of the kind in which a spring influenced cotter pin or similar cross member is arranged to be turned about an axis transverse to its length so that it may be engaged in notches in a relatively fixed member.

In known constructions of cowling turn buttons this cross member, carried by a shank bolt or like member formed with a cross cut or kerf so that it may be turned by an ordinary screw driver, has been passed through an aperture in the cowling, or a part secured thereto and turned so that it engages behind said cowling or part; hence, in use, the shank has been spring loaded and outward movement of the cowling against the action of the spring has been possible.

One of the objects of the present invention is to provide an improved fastening device which may be locked positively; another object is to enable the effective length of the shank of the device readily to be adjusted according to requirements, and a still further object is so to mount the fastening device as to render it self aligning.

In accordance with the present invention the shank of a fastening device is rotatably mounted on a cowling or other part to be fastened, and is provided with a spring influenced cross member movable axially in relation thereto and arranged to engage in notches in the cowling or a part secured thereto to lock the shank in its different angular positions, but without passing through the structure to which the cowling or the like is to be secured, while at that end of the shank remote from the cowling or the like there is provided a suitably shaped head which may be passed through, and turned angularly in relation to, a suitably shaped aperture in said structure to hold the cowling or the like thereagainst.

Preferably the head is screwed on to the shank in order that the effective length of the latter may be adjusted, a spring influenced key, axially slidable with respect to the shank, being provided to engage the shank and head to lock the head in its angularly adjusted position.

In order that the shank of the improved fastening device may be self-aligning, the under or inner side of its head may be spherical and bear against a correspondingly formed seating.

The cross member by which the shank may be locked is preferably formed with a tongue lying in the kerf of the shank and, when the shank is locked, filling said kerf so that a flush exterior surface is presented.

The invention is illustrated by the accompanying drawings in which:

Figure 3 is a similar view to Figure 1, but showing the turn button in its operative position.

Figure 4 is an inverted plan view thereof (i. e. is a fragmentary view from the outside of the cowling).

Figure 1:
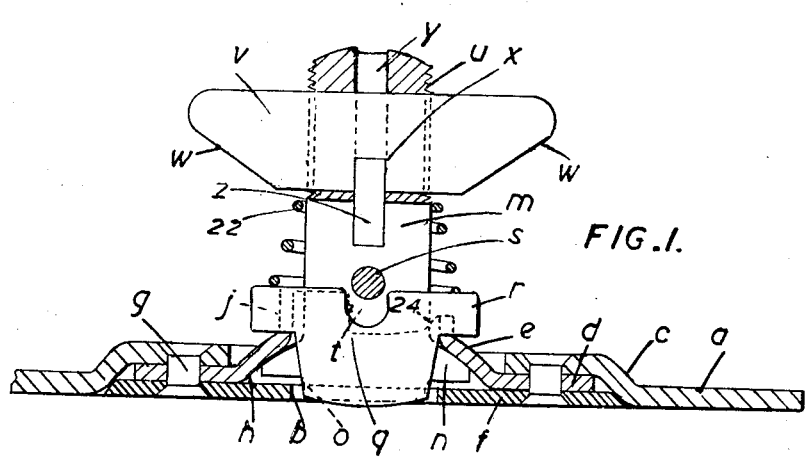
Figure 1 is a sectional side elevation of one form of the improved turn button in its inoperative position (i. e. with its head in the angular position required to enable it to be passed through an oval hole in the structure to which the cowling is to be secured).
Figure 2:
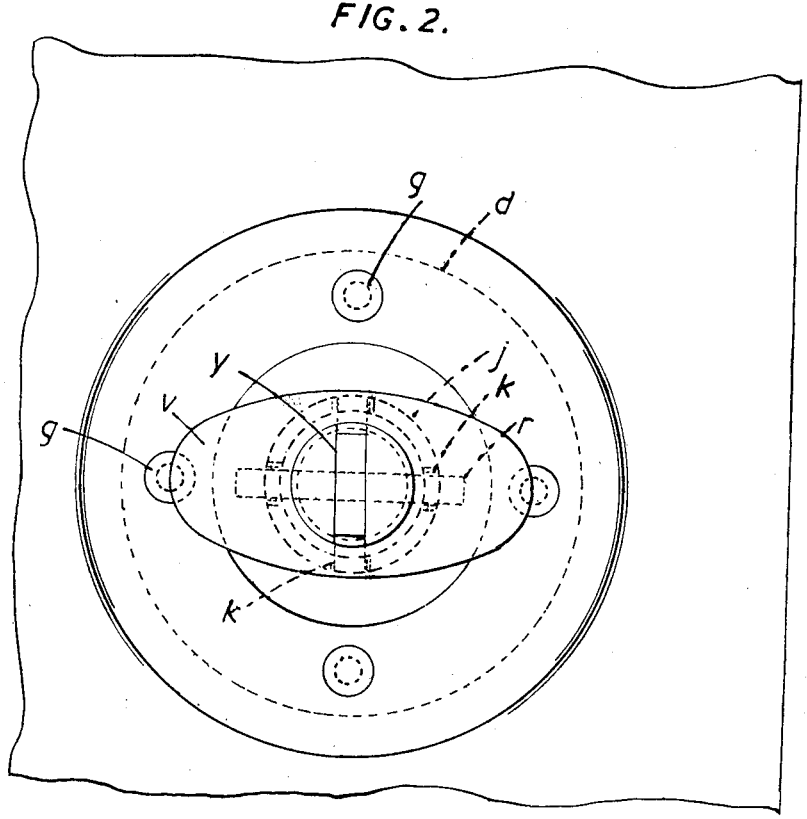
Figure 2 is a plan view thereof.

Figure 5 corresponds with Figures 1 and 3, but shows the turn button partially turned between its operative and inoperative positions.

Figure 6 is a perspective view illustrating a modified form of the improved turn button.

Figure 7 is an exploded view showing, in perspective, the components of the turn button illustrated in Figure 6.

Figure 8 is a perspective view of a further modification of the invention, and

Figure 9 is an exploded view showing, in perspective, the components of the turn button illustrated in Figure 8.

In the form of the invention shown in Figures 1 to 5, that part of a cowling panel $a$ where a fastener is to be situated is apertured as at $b$ and pressed in as at $c$ around the margin of the aperture $b$ to receive a circumferential flange $d$ on a housing $e$ and a centrally apertured cover plate $f$ therefor, both of which are riveted as at $g$ to said margin, the outer surface of the cover plate $f$ lying flush with that of the cowling $a$. The housing $e$ comprises the circumferential flange $d$, an intermediate zone which constitutes a spherical seating $h$, and an inner zone $j$ which is cylindrical and is formed at its inner edge with two pairs of diametrically opposite notches such as $k$. Through the housing $e$ passes a shank $m$, the under or inner side of the head $n$ of which is spherical and bears against the spherical seating $h$. At its outer end the head $n$ of the shank $m$ has a cylindrical projection $o$ of reduced diameter which extends into the central aperture of the cover plate $f$ as far as the outer surface of said plate, and the outer end of the shank $m$ and its projection $o$ are slotted diametrically to present a kerf or slot $p$ and also to receive a flat locking member $q$. This locking member $q$ is somewhat T-shaped, its cross limb $r$ projecting laterally from the shank $m$ and overhanging the cylindrical inner zone $j$ of the housing $e$ and being formed so as to engage in the notches $k$ at the inner edge thereof, and to have its central limb lying in the diametral slot $p$ in the outer end of the shank $m$ and extending outwardly so as to be flush with the end of the cylindrical projection $o$ when the fastening device as a whole is locked in its operative position as shown in Figure 3. The slot $p$ in the outer end of the shank $m$ is traversed by a cross pin $s$ and the cross limb $r$ of the locking member $q$ is gapped correspondingly as at $t$, Figure 1, to straddle the cross pin $s$ to prevent lateral displacement of the locking member $q$.

The inner end of the shank $m$ is threaded as at $u$ and there is screwed thereon an oval head $v$ the operative face of which (i. e. that face which is directed outwardly or towards the cowling $a$) is convergent outwardly as at $w$ and is formed with a cross cut or kerf $x$. The inner end of the shank $m$ is also cross cut as at $y$ (preferably on a plane at right angles to the cross cut $p$ at its outer end) to receive a second T-shaped locking member $z$ the cross limb 21 of which projects laterally from the shank $m$ so as to engage in the cross cut or kerf $x$ in the head $v$, while its central limb lies in the cross cut $y$ in the inner end of the shank $m$. A spring 22 coiled about the central portion of the shank $m$ serves to urge the two locking members $q$ and $z$ away from one another into their locking positions.

The structure (not shown) to which the cowling is to be secured is formed with an oval hole to give passage to the head $v$ of the shank $m$, the wall of this hole is tapered to correspond with the operative face $w$ of the head $v$, and when the fastening device is to be engaged its shank $m$ is pressed back by a tool such as a screw driver 23, Figure 5, and turned to bring the major axis of its head $v$ into correspondence with that of the hole in the structure, as shown in Figure 1, the head $v$ is entered into the hole and the shank $m$ and its head $v$ are turned through 90°, to the position shown in Figure 3. Owing to the taper of the operative face $w$ of the head $v$ this turning movement produces a wedging action and draws the cowling $a$ closely and securely against the structure. The threading $u$ of the head $v$ on the shank $m$ enables the effective length of the shank $m$ readily to be adjusted by turning the head $v$ on the shank $m$ after its locking member $z$ has been pressed back against the action of its spring 22.

It is to be understood that when the screw driver 23 is inserted into the kerf $p$ in order to turn the shank $m$, the locking member $q$ is pressed in until its cross limb $r$ is clear of the notches $k$ at the inner end $j$ of the housing $e$, and the shank $m$ and the parts carried thereby are then turned.

When the head $v$ has been turned to its operative position the locking member $q$ co-operates with one pair of notches $k$, $k$ at the end of the inner cylindrical zone $j$ of the housing and prevents rotation positively. Similarly, when the head $v$ has been turned to its inoperative or disengaging position (Figure 1) the locking member $q$ cooperates with the second pair of notches $k$, $k$ and locks the head $v$ positively in that position, so that it is ready to be entered into the hole in the structure.

In order to give a visual indication when the head $v$ is in its operative position, it is desirable that the first pair of notches at the end of the inner cylindrical zone $j$ of the housing $s$ should be somewhat deeper than the second pair; hence, the end of the central limb of the locking member $q$ will be flush with the outer end of the cylindrical projection $o$ from the end of the shank $m$ when the oval head $v$ is in its operative position, but will not be when said head is locked in its inoperative position.

The notched inner end $j$ of the housing $e$ may be formed with cam surfaces such as 24 (Figures 1 and 3) leading to the notches $k$ and the arrangement may be such that the cross limb $r$ of the locking member $q$ is turned backwards and forwards through the same 90° or it may be arranged for complete rotation in either direction.

Owing to the spherical mounting of the shank $m$ on the cowling $a$ provision is made for malalignment of the parts due to warping or other reason, and it is to be noted that the shank $m$ is not spring-loaded for the actual engagement of the cowling $a$ with the structure, the spring 22 being provided merely to urge the two locking members $q$ and $z$ into their engaging portions, hence, the cowling $a$ is locked positively and yielding of a spring will not permit it to move away from the structure.

If very fine adjustment of the effective length of the shank $m$ be required, its oval head $v$ may be formed with a plurality of cross cuts such as $x$ to receive the locking member $z$.

The form of the invention illustrated in Figures 6 and 7 is very similar to that described hereinbefore. In this example, however, the principal differences, apart from the general shape of the parts, are that the head of the shank $m$ is not formed with a spherical surface received in a corresponding seating in the housing $e$, but has a collar 25 of rectangular cross-section, while instead of a head screwed on to the shank $m$ the head is constituted by a cotter pin 26 which is received in the same slot $p$ in the shank $m$ as the locking member $q$. The cotter pin 26 is received partly in notches 27, 27 in a washer 28 and partly in notches 29 . . . in a nut 30 screwed on the shank $m$, and it has a central projection 31 by which it is centralized in relation to the washer 28. The ends of the cotter pin 26 are bevelled as at 32 to co-operate with a bevelled mouth on an oval sleeve 33 mounted on the structure 34 to which the panel $a$ is to be fastened. In order to adjust the effective length of the shank $m$ the cotter 26 and the washer 28 are pressed back against the action of the spring 22 until the cotter is clear of the notches 29 in the nut 30, the nut 30 is turned to the required extent and the cotter 26 is then released to re-engage in notches 29 in the nut 30.

Figures 8 and 9 illustrate a simpler form of the invention in which the shank $m$ is tubular, is slotted at $p$ for a locking member $q$ and is bored transversely as at 35 to receive a cylindrical cotter 36 the ends of which are conical as at 37 and the central part of which is formed with a flat 38. The conical ends 37, 37 of the cotter 36 co-operate with the flared margins 39 of an elongated aperture 40 in the structure 34 to which the panel $a$ is to be fastened, while the flat 38 presents a seating for the spring 22 which is disposed within the tubular shank $m$, the shoulders such as 41 at the ends of the flat 38 serving to prevent displacement of the cotter 36 when the parts have been assembled.

This form of cotter does not provide for variation of the effective length of the shank $m$. It will be appreciated that the modifications of the invention illustrated in Figures 6 to 9 may be made self-aligning in a similar manner to the shank $m$ in the form of the invention shown in Figures 1 to 5.

We claim:

1. A fastening device for attaching a cowling or the like having an opening therein to another member while providing a substantially smooth and unbroken outer surface on the cowling at the point of attachment, comprising a seating having a hole therein positioned at said opening and extending inwardly with regard to the cowling, said seating having at least two notches positioned in its inner portion, a shank positioned within said hole and having at its inner end a threaded portion and at its outer end an enlarged head engaging the outer surface of said seating, a first locking member carried by said shank and movable only axially relative thereto, said first locking member having portions engageable with said notches, and having a portion accessible from the outside of said cowl to permit urging of the locking member inwardly to disengage the locking member from said notches, an attaching member threaded on the inner end of said shank and thereby adapted to be movable to a plurality of positions relative to the shank, a second locking member carried by said shank and movable with regard thereto only in an axial direction, said second locking member being engageable with said attaching member to secure the attaching member against rotation relative to said shank, and spring means positioned between said first and second locking members to urge the first locking member into engagement with said seating, and to urge the second locking member into engagement with said attaching member, whereby said shank may be rotated to rotate said attaching member only after movement of said first locking member against the spring pressure out of engagement with said notches, and whereby said attaching member is adjustable along the shank by movement of said second locking member against said spring pressure out of engagement with the attaching member.

2. A fastening device as set forth in claim 1, said second locking member comprising a key extending diametrically through said shank, said attaching member having a plurality of notches for receiving said key.

3. A fastening device for attaching a cowling or the like having an opening therein to another member while providing a substantially smooth and unbroken outer surface on the cowling at the point of attachment, comprising a seating having a hole therein positioned at said opening and extending inwardly with regard to the cowling, said seating having at least two notches positioned in its inner portion, a shank positioned within said hole and having at its inner end a threaded portion and at its outer end an enlarged head engaging the surface of said seating, a first locking member carried by said shank and movable only axially relative thereto, said first locking member having portions engageable with said notches, and having a portion accessible from the outside of said cowl to permit urging of the locking member inwardly to disengage the locking member from said notches, a nut threaded on the inner end of said shank, said nut having at least two notches therein, an attaching member in the form of a key passing diametrically through said shank and engageable with the notches in said nut to hold the nut against rotation, said attaching member being movable axially relative to the shank but being rotatable with said shank, a washer slidable along said shank and having at least two notches for receiving said attaching member, and a spring carried by said shank between said first locking means and said washer to urge the first locking member into engagement with said seating, and to urge the washer and thereby said attaching member into engagement with said nut, whereby said shank may be rotated to rotate said attaching member only after movement of said first locking member against the spring pressure out of engagement with the noches in said seating, and whereby the position of said attaching member on said shank is adjustable by pressing of the attaching member and washer against said spring to move the attaching member out of the notches in said nut to free the nut for movement on the threaded portion of the shank.

4. A fastening device as set forth in claim 1, said shank having a first diametrical slot in its outer end portion, said first locking member being slidably mounted in said slot, said shank also having a second diametrical slot in its inner end portion positioned at an angle to said first slot, said second locking member being slidably mounted in said second slot.

5. A fastening device for attaching a cowling or the like having an opening therein to another member while providing a substantially smooth and unbroken outer surface on the cowling at the point of attachment, comprising a seating having a hole therein positioned at said opening and extending inwardly with regard to the cowling, said seating having at least two notches positioned in its inner portion, a shank positioned within said hole and having an enlarged head engaging the outer surface of said seating, a locking member carried by said shank and movable only axially relative thereto, said locking member having portions engageable with said notches, and having a portion accessible from the outside of said cowling to permit urging of the locking member inwardly to disengage the locking member from said notches, an attaching member carried by the inner end of the shank, and a spring carried by said shank, one end of said spring being anchored against movement by said attaching member, and the other end of said spring urging said locking member toward engagement with said notches, said shank having a diametrically extending slot opening to the outer end of the shank, and said locking member being disposed within said slot and having a tongue lying in the outer end of the slot and filling the outer end of the slot with its end surface flush with the end surface of the shank when said locking member is in engagement with said notches.

6. A fastening device for attaching a cowling or the like having an opening therein to another member while providing a substantially smooth and unbroken outer surface on the cowling at the point of attachment, comprising a seating having a hole therein positioned at said opening and extending inwardly with regard to the cowling, said seating having at least two notches positioned in its inner portion, a shank positioned within said hole and having an enlarged head engaging the outer surface of said seating, a locking member carried by said shank and movable only axially relative thereto, said locking member having portions engageable with said notches, and having a portion accessible from the outside of said cowling to permit urging of the locking member inwardly to disengage the locking member from said notches, an attaching member carried by the inner end of the shank, and a spring carried by said shank, one end of said spring being anchored against movement by said attaching member, and the other end of said spring urging said locking member toward engagement with said notches, said attaching member being generally cylindrical in its central portion and being positioned with said central portion passing through said shank, said cylindrical portion having a flat portion providing an abutment for one end of the spring, said flat portion having shoulders at its ends to engage the spring and prevent accidental movement of said attaching member out of the shank.

ARTHUR EVANS.
WILLIAM EDMUND EDWARDS.

REFERENCES CITED

The following references are of record in the file of this patent:

UNITED STATES PATENTS

| Number | Name | Date |
|---|---|---|
| 466,463 | Holland | Jan. 5, 1892 |
| 1,208,620 | Moser | Dec. 12, 1916 |
| 1,352,918 | Rohbock | Sept. 14, 1920 |
| 2,382,518 | Summers | Aug. 14, 1945 |